United States Patent
Huang

(10) Patent No.: US 6,480,488 B1
(45) Date of Patent: Nov. 12, 2002

(54) METHOD AND APPARATUS FOR SORTING AND TRANSMITTING DATA PACKETS

(75) Inventor: Wen-Hsiung Huang, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/105,459

(22) Filed: Jun. 26, 1998

(30) Foreign Application Priority Data

Jan. 23, 1998 (CN) .......................................... 87100995 A

(51) Int. Cl.[7] .............................................. H04L 12/28
(52) U.S. Cl. ...................................... 370/389; 370/255
(58) Field of Search ................................ 370/252, 254, 370/255, 256, 257, 258, 389, 390, 392, 393, 396, 397, 398, 399, 400, 401, 402, 404, 405, 407, 411, 408, 421–425, 463

(56) References Cited

U.S. PATENT DOCUMENTS

| 4,933,937 A | * | 6/1990 | Konishi | 370/404 |
| 5,151,897 A | * | 9/1992 | Suzuki | 370/401 |
| 5,617,421 A | * | 4/1997 | Chin et al. | 370/402 |
| 5,910,955 A | * | 6/1999 | Nishimura et al. | 370/401 |
| 6,128,296 A | * | 10/2000 | Daruwalla et al. | 370/389 |

* cited by examiner

Primary Examiner—Huy D. Vu
Assistant Examiner—Steven Nguyen
(74) Attorney, Agent, or Firm—Thomas, Kayden Horstemeyer & Risley, LLP

(57) ABSTRACT

The present invention relates to a method for sorting and transmitting a data packet which is applied to a LAN. The method and apparatus of the invention comprises the steps of: (a) searching and comparing the source address of the data packet with the reference list stored in the address table of the port controller connected to the first terminal equipment; (b) refreshing the content of the reference list by adding the address data consisting of the source address representing the network card identifier of the first terminal equipment and the port number of the port controller connected to the first terminal equipment when the source address of the data packet can not be located in the address table; and (c) transmitting a new address learning frame, formed by assembling the source address representing the network card identifier of the first terminal equipment and the port number of the port controller connected to the first terminal equipment, via an intercom channel to the address tables of other port controllers for refreshing the contents of the reference lists.

4 Claims, 4 Drawing Sheets

METHOD AND APPARATUS FOR SORTING AND TRANSMITTING DATA PACKETS

FIELD OF THE INVENTION

The invention relates to a method and apparatus for sorting and transmitting a data packet, and more particularly, to a method and apparatus for sorting and transmitting a data packet in a local area network.

REFERENCE TO PRIOR APPLICATION

This application has been filed in the R.O.C. (Taiwan) as Patent Application No. 87100995 on 1998.

BACKGROUND OF THE INVENTION

A local area network (LAN) having advantages of source sharing, data sharing and data switching, can be implemented via appropriately connecting the computers and communication equipment in a company, is widely used by many enterprises. A HUB is a frequently used constituent part for constructing a LAN. Referring to FIG. 1, it illustrates the functional block of a conventional HUB utilizing Carrier Sense with Multiple Access/Collision Detection (CSMAICD) technology, wherein n terminal equipment such as computers are connected to the same cable via n ports (11, 12 . . . 1*n*). CSMA/CD utilizes a "listen before talk" algorithm in which each terminal equipment will detect whether the shared cable is transmitting data before transmitting a frame signal. If there is no transmission on the shared cable, the signal to be transmitted is then transmitted. Two terminal equipment may simultaneously determine that there is no transmission on the shared cable and thus both start to transmit their frames simultaneously. A collision is then occurred once the frame signals are simultaneously transmitted to the shared cable. When a collision is occurred, the transmitted data is deemed as collided data and will be neglected. The terminal equipment wishing to transmit data have to wait for a period of time (3~5 seconds) to transmit the data again. Therefore, the more the terminal equipment, the more the collisions and the worse the network efficiency. To improve such a disadvantage, a switch utilizing switching technology for transmitting data is used to connect a network. The switching technology of the switch provides simultaneous data transmission between/among at least two pairs of ports in the same network, and thus the network efficiency is significantly improved.

Referring to FIG. 2, it illustrates the structure of a LAN having a switch fabric, wherein a network is formed by connecting unicast output channels 40*a*, 40*b*, 40*c* and 40*d* and unicast input channels 41*a*,41*b*,41*c* and 41*d* of four port controllers 20, 21, 22 and 23 to a switch fabric 24. The port controllers 20, 21, 22 and 23 each comprises a plurality of ports (20*a*, 20*b*, . . . 20*n*, 21*a*, 21*b*, . . . 21*n*, 22*a*, 22*b*, . . . 22*n*, and 23*a*, 23*b*, . . . 23*n*) for connecting a plurality of terminal equipment. Besides, the port controllers 20, 21, 22 and 23 are connected to the switch fabric 24 via an intercom channel 25.

Referring to FIG. 3, it illustrates the functional block of the port controller 21. A terminal equipment is connected to the port controller 21 via port 21*n*, wherein a medium access controller (MAC) 211 receives and decodes the data packet transmitted from the terminal equipment. The data packet format is as follows:

| Destination Address (DA) | Source Address (SA) | Data to be Transmitted (Data) |
| --- | --- | --- | wherein the DA and SA are each the network card identifier, which is embedded in the network card with a length of 48 bits during manufacture, of the destination and source terminal equipment. The data packet is decoded by the MAC 211, then the DA and SA are transmitted to a router 212, and the DA, SA and the data to be transmitted (Data) are transmitted to a data queue 213 for storing. The router 212 compares the DA with the addresses stored in the address table 214. If the corresponding address of the DA of the Data can be located in the address table 214, a port number corresponded to the address can be got and is used to be the destination port. The router 212 transmits the Data stored in the queue 213 and the corresponding address (MAC address and the port number) from channel 40*b* to the switch fabric 24. The switch fabric 24 decodes the destination port number to get a destination channel (41*a*, 41*c* or 41*d*) and then transmits the Data from the destination channel to the specific port of the specific port controller. If the Data is a broadcast frame, the router 212 will broadcast the broadcast frame to every terminal equipment in the LAN via the intercom channel 25. If the DA to be located can not be located in the address table, the router 212 will deem the Data as a broadcast frame and transmit the Data to every port controller. The comparing and recording operation of the SA relate to a learning process. That is to say, the source is deemed as a new coming source when the corresponding address of the SA can not be located in the address table 214. The recorded reference list in the address table 214 itself should be refreshed, thereby recording the corresponding port of the source address. Besides, the source address of the address table of the destination port will also be refreshed when the Data is transmitted to the destination port such that the source address and the source port number of every Data can be recorded in the address table of every port controller. Therefore, the source address and source port number of the Data. can be learned only by the port controller that the Data passes. If the Data is transmitted to one of the port controllers in a unicast manner, then the source address and source port number of the Data can be learned only by the port controller that receives the Data. The other port controllers that do not receive the Data can not learn (or record) the source address and source port number of the Data. Therefore, in the prior art, the Data from the source address that can not be located in the address table will be broadcasted by the port controller. However, when a lot of terminal equipment are equipped in the LAN and the broadcast frame is frequently used, the network speed will be significantly reduced. Therefore, it is the main object of the invention to improve the drawbacks of the prior art.

SUMMARY OF THE INVENTION

In view of the disadvantages of the prior art, it is an object of the present invention to provide a method and apparatus for sorting and transmitting a data packet which is applied to a LAN. The LAN is formed by connecting a switch fabric and a plurality of port controllers. Each of the port controllers comprises a plurality of ports for connecting a plurality of terminal equipment. The port controllers are connected to the switch fabric via an intercom channel. Each of the port controllers comprises an address table for storing a reference list consisting of the port numbers of the port controllers connected to the terminal equipment and the network card addresses (identifiers) of the terminal equipment. A data packet to be transmitted from a first terminal equipment to a second terminal equipment comprises a destination address represented the network card identifier of the second terminal equipment, a source address represented the network card identifier of the first terminal equipment and data to be transmitted. The method comprises the steps of: (a) searching and comparing the source address of the data packet with the reference list stored in the address table of the port controller connected to the first terminal equipment; (b) refreshing the content of the reference list by adding. the source address representing the network card identifier of the first terminal equipment and the port number of the port controller connected to the first terminal equipment when the source address of the data packet can not be located in the address table; and (c) transmitting a new address learning frame, formed by assembling the source address representing the network card identifier of the first terminal equipment and the port number of the port controller connected to the first terminal equipment, via an intercom channel to the address tables of other port controllers for refreshing the contents of the reference lists.

According to the method for sorting and transmitting a data packet of the invention, the transmission priority of the new address learning frame is higher than that of the data to be transmitted.

BRIEF DESCRIPTION OF THE DRAWINGS

For a more complete understanding of the present invention and the advantages thereof, reference is now made to the following descriptions taken in conjunction with the accompanying drawings which illustrate one or more embodiments of the present invention.

DETAILED DESCRIPTION OF THE INVENTION

Figure 1:
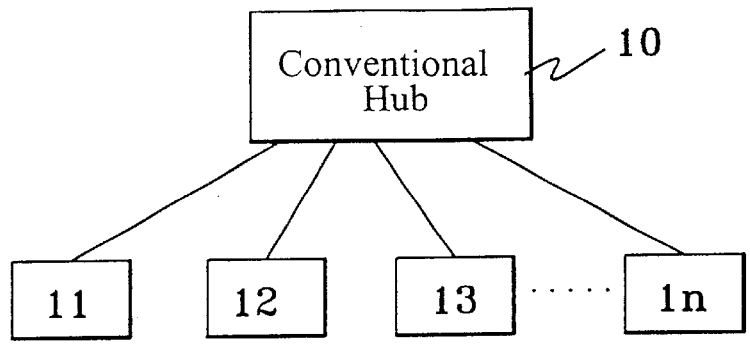
FIG. 1 illustrates the functional block of a conventional HUB utilizing Carrier Sense with Multiple Access/Collision Detection (CSMA/CD) technology.
Figure 2:
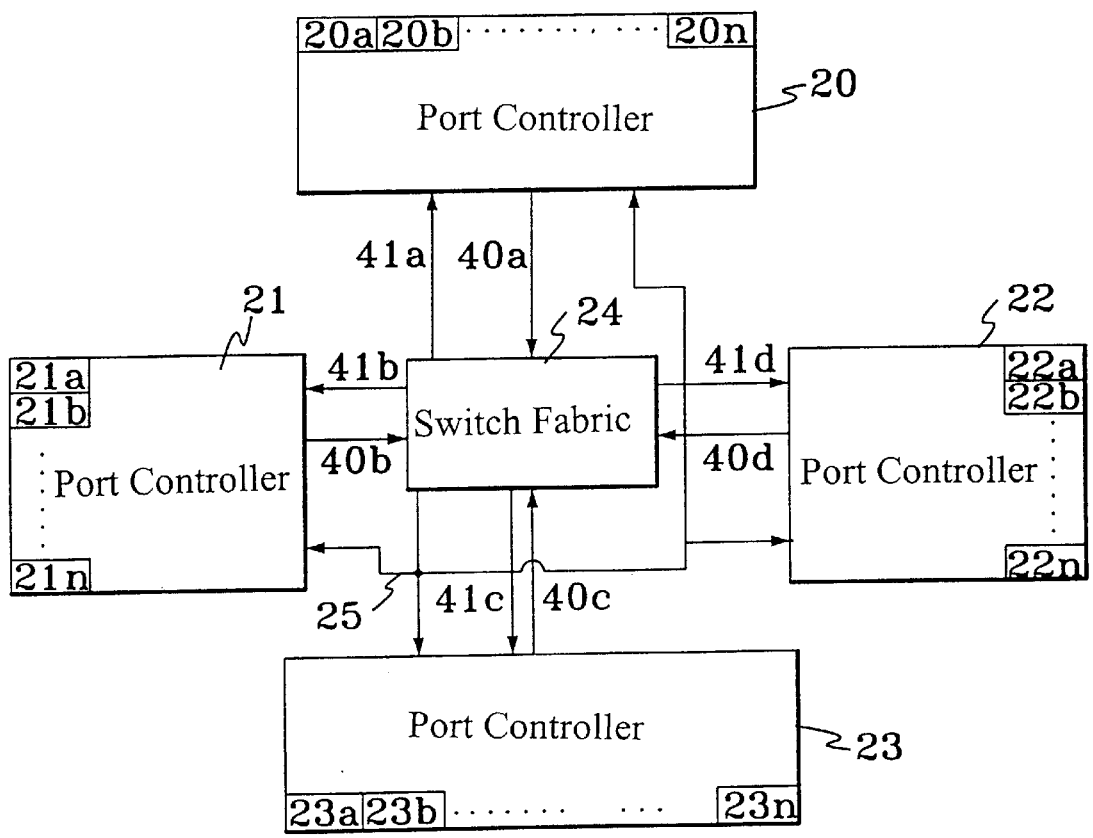
FIG. 2 illustrates the structure of a LAN utilizing switch technology.
Figure 3:
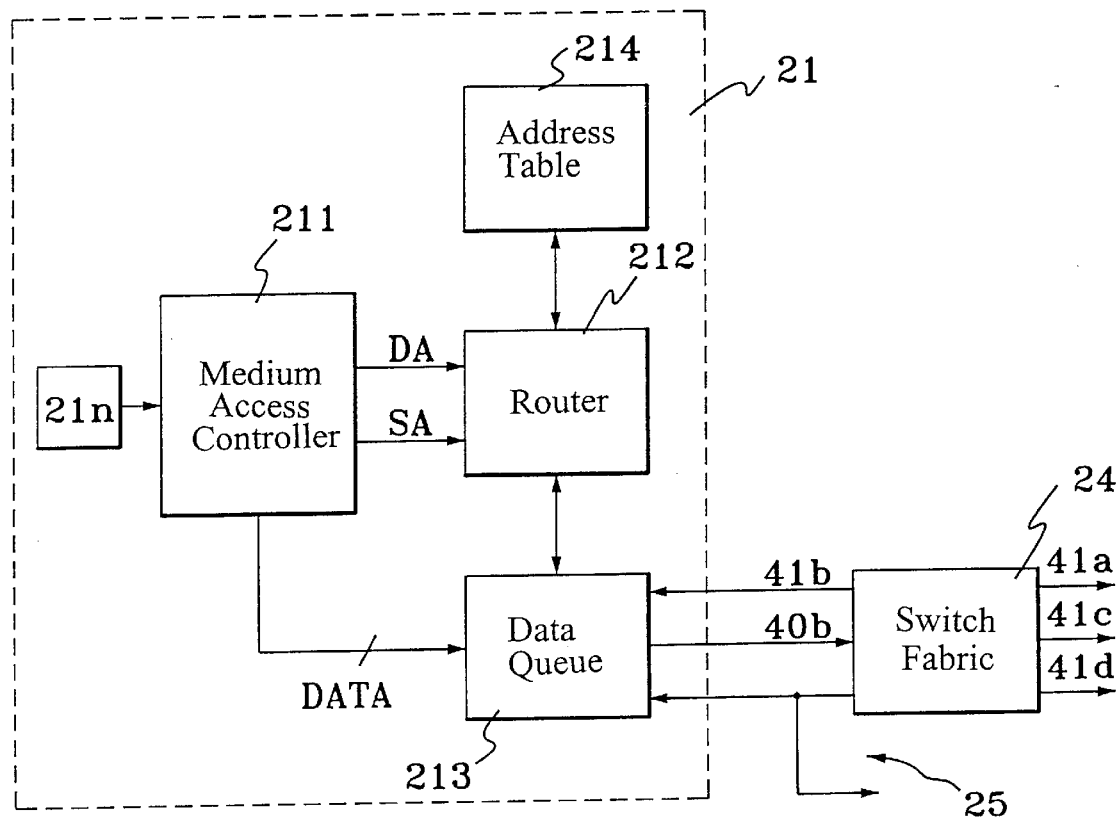
FIG. 3 illustrates the functional block of the port controller in a LAN utilizing switch technology.
Figure 4:
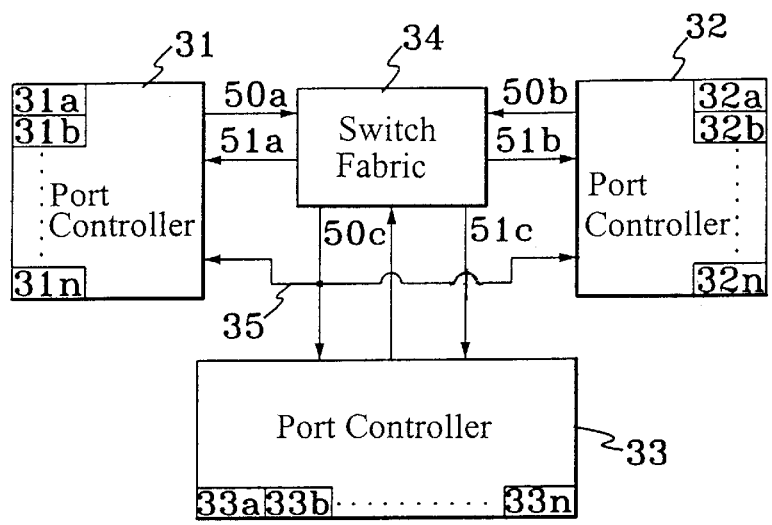
FIG. 4 illustrates the structure of a LAN utilizing switch technology of the invention.

Referring to FIG. 4, it illustrates the structure of a LAN utilizing switch technology of the invention, wherein a network is formed by connecting unicast output channels 50a, 50b and 50c and unicast input channels 51a, 51b and 51c of three port controllers 31, 32 and 33 to a switch fabric 34. The port controllers 31, 32 and 33 each comprises a plurality of ports (31a, 31b, . . . 31n, 32a, 32b, . . . 32n, and 33a, 33b, . . . 33n) for connecting a plurality of terminal equipment. Besides, the port controllers 31, 32 and 33 are connected to the switch fabric 34 via an intercom channel 35.

Figure 5:
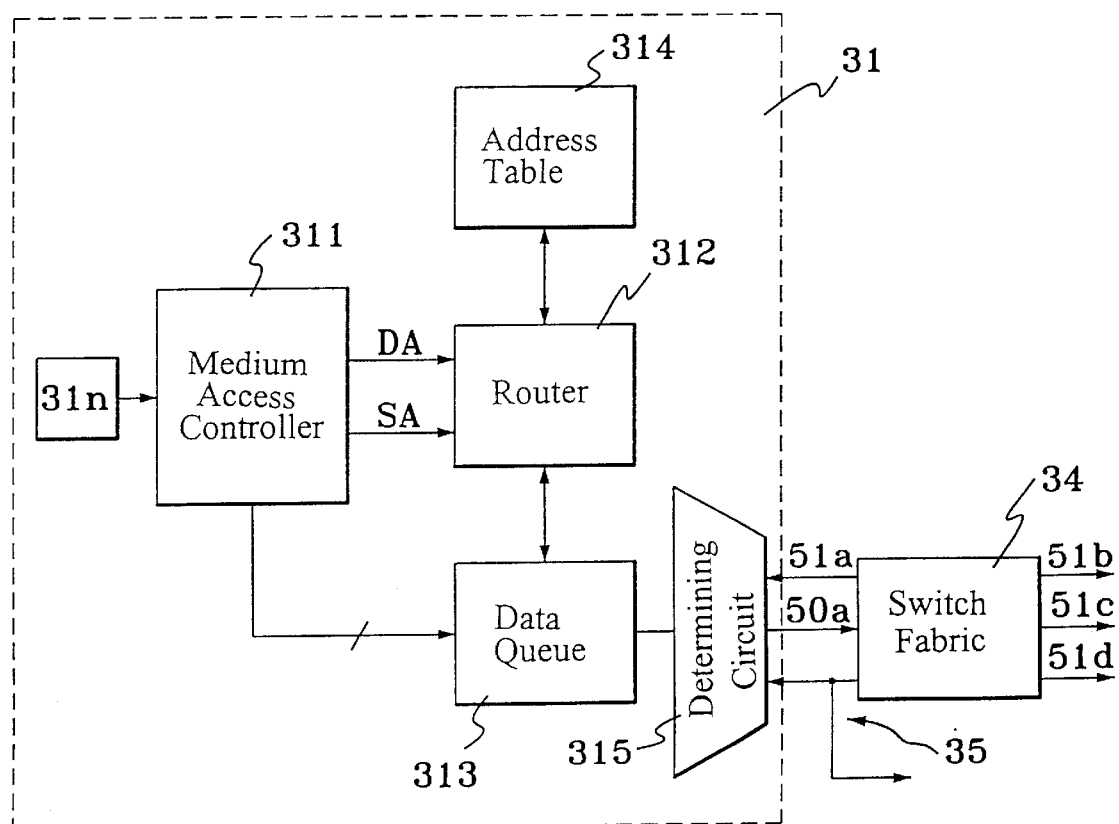
FIG. 5 illustrates the functional block of the port controller of the invention.
Figure 6:
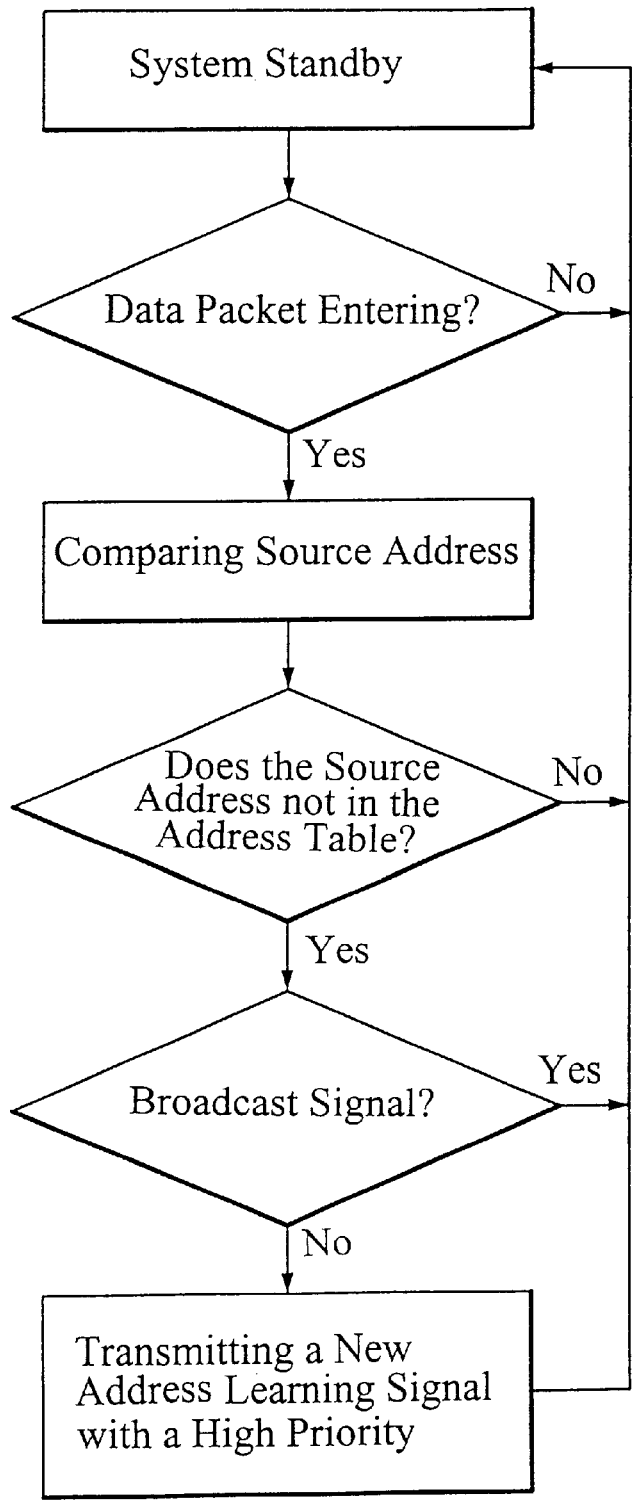
FIG. 6 illustrates the flow chart of the method of the invention.

Referring to FIG. 5, it illustrates the functional block of the port controller 31 of the invention. A terminal equipment is connected to the port controller 31 via port 31n, wherein a medium access controller (MAC) 311 receives and decodes the data packet transmitted from the terminal equipment. The data packet format is as follows:

| Destination Address (DA) | Source Address (SA) | Data to be Transmitted (Data) |
|---|---|---| wherein the DA and SA are each the network card identifier, which is embedded in the network card with a length of 48 bits during manufacture, of the destination and source terminal equipment. The data packet is decoded by the MAC 311, then the DA and SA are transmitted to a router 312, and the DA, SA and the data to be transmitted (Data) are transmitted to a data queue 313 for storing. The router 312 compares the DA with the addresses stored in the address table 314. If the corresponding address of the DA of the Data can be located in the address table 314, a port number corresponded to the address can be got and is used to be the destination port. The router 312 transmits the Data stored in the data queue 313 and the corresponding address (MAC address and the port number) from channel 50a to the switch fabric 34. The switch fabric 34 decodes the destination port number to get a destination channel (51a, 51c or 51d) and then transmits the Data from the destination channel to the specific port of the specific port controller. If the Data is a broadcast frame, the router 312 will broadcast the broadcast frame to every terminal equipment in the LAN via the intercom channel 35. If the DA to be located can not be located in the address table, the router 312 will deem the Data as a broadcast frame and transmit the Data to every port controller. The comparing and recording operation of the SA relate to a learning process. That is to say, the source is deemed as a new coming source when the corresponding address of the SA can not be located in the address table 314. The recorded reference list in the address table 314 itself should be refreshed, thereby recording the corresponding port of the source address. Besides, the source address of the address table of the destination port will also be refreshed when the Data is transmitted to the destination port such that the source address and the source port number of every Data can be recorded in the address table of every port controller. Therefore, the source address and source port number of the Data can be learned only the port controller that the Data passes. If the Data is transmitted to one of the port controllers in a unicast manner, then the source address and source port number of the Data can be learned only by the port controller that receives the Data. The other port controllers that do not receive the Data can not learn (or record) the source address and source port number of the Data. Therefore, in the prior art, the Data from the source address that can not be located in the address table will be broadcasted by the port controller and thus the network speed is significantly reduced due to the broadcast frame is frequently used. Referring to FIG. 6, it illustrates the flow chart of the method of the invention for recognizing, sorting and transmitting the data packet. A data packet transmitted from a first terminal equipment is received by MAC 311 for decoding, wherein the SA is searched and compared with the addresses stored in the address table 314. If the corresponding address of the data packet can not be located in the address table 314, whether the data packet is a unicast frame is further determined. If the data packet is a unicast frame, not only the content of the reference list is refreshed by adding the address data consisting of the source address representing the network card identifier of the first terminal equipment and the port number of the port controller connected to the first terminal equipment in the address table 314 itself but also the address data consisting of the source address representing the network card identifier of the first terminal equipment and the port number of the port controller connected to the first terminal equipment is assembled into a new address learning frame (NALF) that is broadcasted via the intercom channel 35 to the address tables of other port controllers for refreshing the contents of the reference lists. The Data of the unicast frame is then transmitted to the specific port of the specific port controller according to the corresponding address (MAC address and port number) of the DA in the address table 314. The transmission priority of the NALF is higher than that of the data to be transmitted. Whether the data packet is a unicast frame is determined by a determination circuit 315. Therefore, the conventional reference list refreshing operation by broadcasting the whole data packet (comprises DA, SA and Data) via the intercom channel 35 to the address table of every port controller in the LAN can be avoided. Besides, the transmission times of the broadcast frame and the data amount and the collision times can be significantly reduced. The network efficiency is thus effectively increased.

Although the present invention and its advantage have been described in detail, it should be understood that various changes, substitutions and alternations can be made herein without departing from the spirit and scope of the invention as defined by the appended claims.

What is claimed is:

1. A method for sorting and transmitting a data packet, the method being applied to a LAN formed by connecting a switch fabric and a plurality of port controllers, each of the port controllers comprising a plurality of ports for connecting a plurality of terminal equipment, the port controllers being connected to the switch fabric via an intercom channel, each of the port controllers comprising an address table for storing a reference list consisting of the address data of the port numbers of the port controllers connected to the terminal equipment and the network card addresses (identifiers) of the terminal equipment, a data packet to be transmitted from a first terminal equipment to a second terminal equipment comprising a destination address represented the network card identifier of the second terminal equipment, a source address represented the network card identifier of the first terminal equipment and data to be transmitted, comprising the steps of:

(a) searching and comparing the source address of the data packet with the reference list stored in the address table of the port controller connected to the first terminal equipment;

(b) refreshing the content of the reference list by adding the address data consisting of the source address representing the network card identifier of the first terminal equipment and the port number of the port controller connected to the first terminal equipment when the source address of the data packet can not be located in the address table; and (c) transmitting a new address learning frame, formed by assembling the source address representing the network card identifier of the first terminal equipment and the port number of the port controller connected to the first terminal equipment, via an intercom channel to the address tables of other port controllers for refreshing the contents of the reference lists, wherein the transmission priority of the new address learning frame is higher than that of the data to be transmitted.

2. A method for sorting and transmitting a data packet in a LAN formed by connecting a switch fabric and a plurality of port controllers, each of the port controllers comprising a plurality of ports for connecting a plurality of terminal equipment, the port controllers being connected to the switch fabric via an intercom channel, each of the port controllers being operative to store a plurality of addresses comprising the address data of the port numbers of the port controllers connected to the terminal equipment and the network card addresses of the terminal equipment, a data packet to be transmitted from a first terminal equipment to a second terminal equipment comprising a destination address representing the network card identifier of the second terminal equipment, a source address representing the network card identifier of the first terminal equipment and data to be transmitted, comprising the steps of:

(a) comparing a data packet source address with a plurality of stored addresses in a port controller connected to the first terminal equipment;

(b) responsive to said comparing step, adding the source address representing the network card identifier of the first terminal equipment and the port number of the port controller connected to the first terminal equipment;

(c) transmitting a new address learning frame, formed by assembling the source address representing the network card identifier of the first terminal equipment and the port number of the port controller connected to the first terminal equipment, via the intercom channel to other port controllers; and (d) storing the transmitted source address in said other port controllers as said plurality of stored addresses, wherein the transmission priority of the new address learning frame is higher than that of the data to be transmitted.

3. An apparatus for sorting and transmitting a data packet in a LAN formed by connecting a switch fabric and a plurality of port controllers, each of the port controllers comprising a plurality of ports for connecting a plurality of terminal equipment, the port controllers being connected to the switch fabric via an intercom channel, each of the port controllers comprising an address table for storing a reference list consisting of the address data of the port numbers of the port controllers connected to the terminal equipment and the network card addresses of the terminal equipment, a data packet to be transmitted from a first terminal equipment to a second terminal equipment comprising a destination address representing the network card identifier of the second terminal equipment, a source address representing the network card identifier of the first terminal equipment and data to be transmitted, comprising the steps of:

(a) means for searching and comparing the source address of the data packet with the reference list stored in the address table of the port controller connected to the first terminal equipment;

(b) means for refreshing the content of the reference list by adding the address data consisting of the source address representing the network card identifier of the first terminal equipment and the port number of the port controller connected to the first terminal equipment when the source address of the data packet can not be located in the address table; and (c) means for transmitting a new address learning frame, formed by assembling the source address representing the network card identifier of the first terminal equipment and the port number of the port controller connected to the first terminal equipment, via an intercom channel to the address tables of other port controllers for refreshing the contents of the reference
wherein the transmission priority of the new address learning frame is higher than that of the data to be transmitted.

4. A LAN for communication among a plurality of terminal equipment comprising:

a switch fabric;

an intercom channel;

a plurality of port controllers, each of the port controllers being connected to the intercom channel and comprising a plurality of ports for connecting a plurality of terminal equipment, the port controllers being connected to the switch fabric via said intercom channel, each of the port controllers being operative to store the address data of the port numbers of the port controllers connected to the terminal equipment and the network card addresses of the terminal equipment, a data packet to be transmitted from a first terminal equipment to a second terminal equipment comprising a destination address representing the network card identifier of the second terminal equipment, a source address represented the network card identifier of the first terminal equipment and data to be transmitted; and an apparatus for sorting and transmitting a data packet comprising:
  (a) means for comparing the source address of the data packet with the stored addresses in the port controller connected to the first terminal equipment;
  (b) means for adding new address data, comprising a source address representing a network card identifier of the first terminal equipment and the port number of the port controller connected to the first terminal equipment, when the source address of the data packet is not a stored address;
  (c) means for transmitting a new address learning frame, formed by assembling the source address representing the network card identifier of the first terminal equipment and the port number of the port controller connected to the first terminal equipment, via said intercom channel, to other port controllers; and
  (d) means for adding said new address to said stored addresses in a port controller wherein the transmission priority of the new address learning frame is higher than that of the data to be transmitted.

* * * * *